(12) United States Patent
Schiefelbein

(10) Patent No.: US 10,432,599 B2
(45) Date of Patent: *Oct. 1, 2019

(54) SECURE SOCKET LAYER KEYSTORE AND TRUSTSTORE GENERATION

(71) Applicant: AT&T Intellectual Property I, L.P., Atlanta, GA (US)

(72) Inventor: Andrew Schiefelbein, St. Louis, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/626,490

(22) Filed: Jun. 19, 2017

(65) Prior Publication Data

US 2017/0295152 A1 Oct. 12, 2017

Related U.S. Application Data

(60) Division of application No. 14/282,194, filed on May 20, 2014, now Pat. No. 9,686,253, which is a
(Continued)

(51) Int. Cl.
*G06F 21/33* (2013.01)
*H04L 29/06* (2006.01)
(Continued)

(52) U.S. Cl.
CPC .......... *H04L 63/062* (2013.01); *H04L 9/3268* (2013.01); *H04L 63/0442* (2013.01);
(Continued)

(58) Field of Classification Search
None
See application file for complete search history.

(56) References Cited

U.S. PATENT DOCUMENTS 7,240,194 B2 7/2007 Hallin
7,823,190 B1 * 10/2010 Kacarov ................. H04L 63/06
380/278
(Continued)

OTHER PUBLICATIONS

Web service layer security(WSLS). Iacono et al. Network Security. (Year: 2008).*
(Continued)

*Primary Examiner* — Venkat Perungavoor
(74) *Attorney, Agent, or Firm* — Hartman & Citrin LLC

(57) ABSTRACT

A method for managing keystore information on a computing device may include requesting a keystore from a distribution system, receiving the keystore from the distribution system, and populating a runtime environment with keystore information contained within the keystore. A method for generating a keystore may include receiving, by a distribution system, a request for a keystore from a computing device, generating a key pair including a public key and a private key, generating a certificate signing request, digitally signing the public key with the private key, generating the keystore, combining the signed public key with the private key in the keystore, and providing the keystore to the computing device. A method for generating a truststore may include receiving, by a distribution system, a request for a truststore from a computing device, generating the truststore, adding a certificate to the truststore, and providing the truststore to the computing device.

20 Claims, 5 Drawing Sheets

Related U.S. Application Data continuation of application No. 13/532,210, filed on Jun. 25, 2012, now Pat. No. 8,738,911.

(51) Int. Cl.
   *H04L 9/32*    (2006.01)
   *G06F 21/71*   (2013.01)

(52) U.S. Cl.
   CPC ............ *H04L 63/06* (2013.01); *H04L 63/061* (2013.01); *H04L 63/0823* (2013.01); *H04L 63/166* (2013.01); *H04L 9/3247* (2013.01)

(56) References Cited

U.S. PATENT DOCUMENTS

| | | | | |
|---|---|---|---|---|
| 8,433,898 | B2* | 4/2013 | Xiao | G06F 21/33 713/155 |
| 8,560,851 | B1 | 10/2013 | Cherukumudi | |
| 8,819,797 | B2 | 8/2014 | Cross | |
| 8,862,872 | B2* | 10/2014 | Vanderveen | H04L 63/0823 713/156 |
| 9,055,057 | B1 | 6/2015 | Rao | |
| 9,325,698 | B2* | 4/2016 | Lovmand | H04L 63/0823 |
| 2002/0080975 | A1* | 6/2002 | Rich | H04L 9/3263 380/286 |
| 2003/0147534 | A1 | 8/2003 | Ablay et al. | |
| 2004/0162786 | A1 | 8/2004 | Cross | |
| 2004/0268152 | A1* | 12/2004 | Xia | H04L 63/0281 726/5 |
| 2005/0071631 | A1* | 3/2005 | Langer | H04L 9/0833 713/156 |
| 2006/0075219 | A1* | 4/2006 | Callaghan | H04L 63/0823 713/156 |
| 2006/0236096 | A1 | 10/2006 | Pelton et al. | |
| 2007/0118735 | A1* | 5/2007 | Cherrington | G06F 21/602 713/155 |
| 2007/0297615 | A1 | 12/2007 | Clarke et al. | |
| 2008/0077791 | A1* | 3/2008 | Lund | H04L 9/3273 713/156 |
| 2008/0155254 | A1* | 6/2008 | Stradling | G06F 21/572 713/157 |
| 2008/0178270 | A1* | 7/2008 | Buss | G06F 21/31 726/5 |
| 2009/0064208 | A1 | 3/2009 | Elrod | |
| 2009/0240936 | A1* | 9/2009 | Lambiase | H04L 63/0272 713/156 |
| 2010/0111300 | A1* | 5/2010 | Kido | H04L 63/0823 380/46 |
| 2010/0131766 | A1* | 5/2010 | Schneider | H04L 63/0823 713/175 |
| 2010/0228969 | A1 | 9/2010 | Kapoor | |
| 2013/0177157 | A1 | 7/2013 | Li et al. | |
| 2013/0281055 | A1 | 10/2013 | Patefield-Smith et al. | |
| 2017/0118029 | A1* | 4/2017 | Salmi | H04L 9/3268 |

OTHER PUBLICATIONS

Web Service Layer Security(WSLS). Iacono. Network Security. (Year: 2008).*

SSL.com, "Q10694—HOWTO: How do I get SSL on my website?" [faq.ssl/article.aspx?id=10694] Accessed May 11, 2012.

Wikipedia, "One-Time Pad," [http://en.wikipedia.org/wiki/One-time_pad] Accessed May 11, 2012.

U.S. Office Action dated Jul. 18, 2013 in U.S. Appl. No. 13/532,210.

U.S. Notice of Allowance dated Jan. 9, 2014 in U.S. Appl. No. 13/532,210.

U.S. Office Action dated Jun. 23, 2016 in U.S. Appl. No. 14/282,194.

U.S. Office Action dated Oct. 12, 2016 in U.S. Appl. No. 14/282,194.

U.S. Notice of Allowance dated Feb. 6, 2017 in U.S. Appl. No. 14/282,194.

U.S. Notice of Allowance dated Feb. 15, 2017 in U.S. Appl. No. 14/282,194.

* cited by examiner

SECURE SOCKET LAYER KEYSTORE AND TRUSTSTORE GENERATION

CROSS REFERENCE TO RELATED APPLICATIONS

This application is a divisional of and claims priority to U.S. patent application Ser. No. 14/282,194, filed on May 20, 2014, entitled "Secure Socket Layer Keystore and Truststore Generation," now U.S. Pat. No. 9,686,253, which is expressly incorporated herein by reference in its entirety and which is a continuation of and claims priority to U.S. patent application Ser. No. 13/532,210, filed on Jun. 25, 2012, entitled "Secure Socket Layer Keystore and Truststore Generation," now U.S. Pat. No. 8,738,911, which is expressly incorporated herein by reference in its entirety.

TECHNICAL FIELD

The concepts and technologies disclosed herein generally relate to communication security. More specifically, the concepts and technologies disclosed herein relate to the generation of Secure Socket Layer ("SSL") keystores and truststores.

BACKGROUND

SSL is a cryptographic protocol that provides communication security over the Internet. SSL is often used to establish a secure connection over which a client and a server may exchange sensitive information such as usernames, passwords, social security numbers, credit card numbers and other financial information, or the like. Some encryption schemes require the client and the server to be preconfigured with a secret key that is used to encrypt and decrypt information. Encryption schemes that utilize such preconfigured secret keys are not suitable for secure information exchanges over the Internet because of the potentially millions of clients that have no prior secret key arrangement with the servers. SSL differs from some encryption schemes in that SSL does not require the client and the server to exchange a secret key before sensitive information can be exchanged over a secure channel, thereby making SSL particularly well-suited for information exchanges over the Internet.

SSL employs the use of asymmetric keys, which are defined in pairs of public and private keys. A key is a piece of information that is applied utilizing an algorithm to a string or block of unencrypted information to produce encrypted information, or to decrypt encrypted information. A public key is made freely available to anybody. A private key is known only to the server. Information encrypted by the client using the public key can be decrypted only by the server's private key. In this manner, the client can send information securely to the server without concern that the information will be decrypted by another party. Also, data encrypted by the server's private key can only be decrypted using the public key.

An SSL certificate is a digital computer file that utilizes a digital signature to bind a public key with an identity of a person or organization that owns a Web site or other resource. An SSL certificate may contain, in addition to the public key, information about the owner such as a domain name, server name, hostname, company name, company location, duration of validity, certificate usage, distinguished name, and/or common name. An SSL certificate may also include information about the certificate authority ("CA") that issued the certificate. An SSL certificate may be formatted according to a standard format, such as provided by X.509 or the like.

SUMMARY

Concepts and technologies disclosed herein are for generating and managing SSL truststore and keystore files. According to one aspect disclosed herein, a method for managing keystore information on a computing device may include requesting a keystore from a keystore distribution system, receiving the keystore from the keystore distribution system, and populating a runtime environment with keystore information contained within the keystore.

According to another aspect disclosed herein, a method for generating a keystore may include receiving, by a distribution system, a request for a keystore from a computing device, generating a key pair including a public key and a private key, generating a certificate signing request, digitally signing the public key with the private key, generating the keystore, combining the signed public key with the private key in the keystore, and providing the keystore to the computing device.

According to another aspect disclosed herein, a method for generating a truststore may include receiving, by a distribution system, a request for a truststore from a computing device, generating the truststore, adding a certificate to the truststore, and providing the truststore to the computing device.

It should be appreciated that the above-described subject matter may be implemented, for example, as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
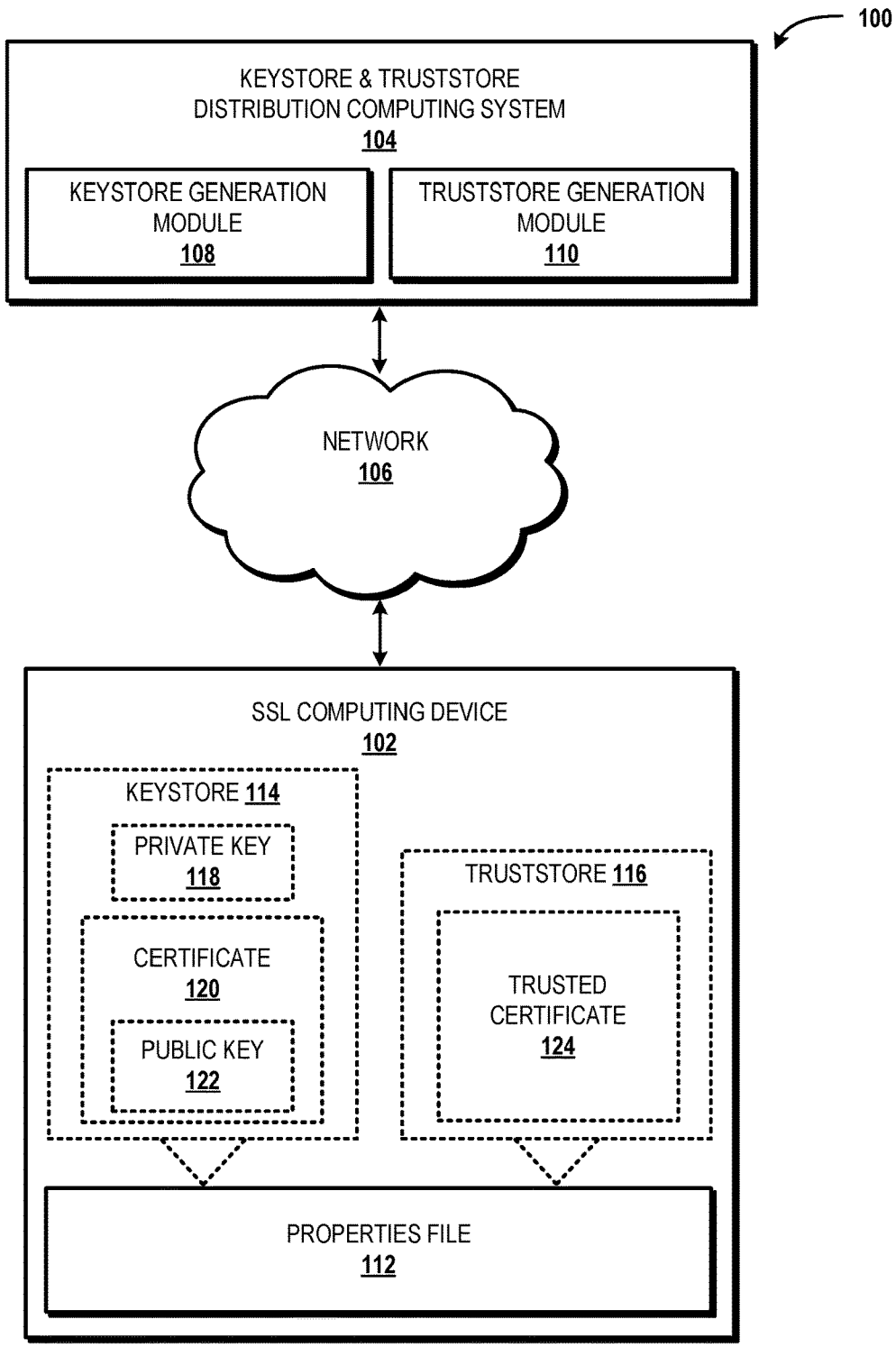
FIG. 1 is a diagram illustrating an illustrative operating environment for implementing various embodiments presented herein.

Obtaining and managing SSL certificates is a time-consuming and resource-consuming process. For instance, in preparation to deploy a server that will utilize SSL to create a secure communication channel over which to exchange sensitive information, the person or organization that desires to deploy the server may be required to request the ability to obtain an SSL certificate, create a public and private key pair, create a certificate signing request ("CSR") that contains information about the person or organization who is requesting the SSL certificate and the public key, send the CSR to a certificate authority that issues SSL certificates, and receive the SSL certificate with approval from the certificate authority. The person or organization may then add the SSL certificate to a keystore that is configured to store such certificates, move the keystore to the server, and verify correct operation of the SSL certificate. Additional or alternative operations may be necessary to obtain a new SSL certificate. Moreover, a substantial portion of the initial SSL certificate request operations may need to be repeated to renew the SSL certificate when the SSL certificate is approaching expiration or has already expired. Some certificates may expire on a yearly basis, while others may expire much sooner such as on a monthly basis.

The concepts and technologies disclosed herein may be utilized by a person or organization to automatically generate and maintain SSL certificates without the need for human interaction. In addition, the time needed to obtain an SSL certificate may be reduced from days utilizing traditional techniques, such as those described above, to milliseconds utilizing the concepts and technologies disclosed herein. Other benefits may become apparent from the subject matter described herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodologies, among others, for generating and managing SSL truststore and keystore files will be presented.

Referring now to FIG. 1, aspects of an operating environment 100 for various embodiments presented herein will be described. The illustrated operating environment 100 includes an SSL computing device 102 that is configured to communicate with a keystore and truststore distribution computing system (hereinafter "distribution system") 104 via a network 106 to obtain keystore and/or truststore files. A keystore (also referred to herein as a "keystore file") contains one or more private keys and one or more certificates that contain corresponding public keys for a computing device such as the SSL computing device 102. A truststore (also referred to herein as a "truststore file") contains certificates from other parties that a computing device expects to communicate with and/or certificates from CAs that the owner of the computing device trusts to identify other parties; these certificates are referred to herein as "trusted certificates."

The SSL computing device 102 may be configured to provide a Web site or other resource to one or more computing devices over the Internet. The individual or organization that owns the Web site or other resource may desire or be required to establish a secure channel over which to exchange information with other computing devices. As such, the SSL computing device 102 may request an SSL certificate from the distribution system 104 and may utilize the SSL certificate to establish an SSL channel over which to exchange information with other computing devices over the network 106 and/or another network. In some embodiments, the SSL computing device 102 is configured to utilize an SSL certificate obtained from the distribution system 104 in a keystore file to facilitate Transport Layer Security ("TLS") via Hypertext Transfer Protocol Secure ("HTTPS") or any other encrypted transport protocol. In these embodiments, the SSL certificate may be formatted in accordance with specifications of TLS, although other formats are contemplated.

In some embodiments, the SSL computing device 102 may be required to obtain authorization to request a keystore and/or truststore from the distribution system 104 from an authority that is outside of the normal SSL process, which may be defined by specific company standards or by the requirements of the computing environment that identify the processes, computing devices, clients, and/or people that are authorized to request a keystore and/or truststore from the distribution system 104. For example, company standards or the requirements of a computing environment may limit clients that are allowed to request a keystore and/or truststore to a specific Domain Name System ("DNS") suffix, such as only clients in the bar.att.com subnet. In this example, foo.bar.att.com is allowed to request a truststore and/or keystore, but glitch.wumpus.att.com is not according to the rule. Another example is if only people in organization X are allowed to request a keystore and/or truststore. In this example, if person A is in organization X and person B is in organization Y, person A is allowed to request the keystore and/or truststore from the distribution system 104, while person B is denied the authority to do so by the rule.

The SSL computing device 102 may be a desktop computer, a laptop computer, a tablet computer, an ultraportable computer, a personal digital assistant ("PDA"), a smartphone, a video game console, a consumer electronics device, or any other type of computing device configured to perform various operations, actions, and/or functions described herein as being performed by the SSL computing device 102. In some embodiments, the SSL computing device 102 is configured as a server to provide a Web site or other resource to one or more client computing devices over the Internet. In some embodiments, the SSL computing device 102 includes a Web server. In some embodiments, the SSL computing device 102 includes a Java 2 Platform, Enterprise Edition ("J2EE") container. In some embodiments, the SSL computing device 102 utilizes Java Database Connectivity ("JDBC"). In some embodiments, the SSL computing device 102 utilizes Lightweight Directory Access Protocol ("LDAP"). It should be understood, however, that the SSL computing device 102 may be configured to utilize any software application and/or protocol that facilitates the use of an SSL channel. As such, the aforementioned embodiments are presented for illustrative purposes only and should not be construed as limiting.

The distribution system 104 may be a desktop computer, a laptop computer, a tablet computer, an ultraportable computer, a PDA, a smartphone, a video game console, a consumer electronics device, or any other type of computing device configured to perform various operations, actions, and/or functions described herein as being performed by the distribution system 104. In some embodiments, the distribution system 104 is configured to operate as a server to provide keystore files and/or truststore files to the SSL computing device 102, which is configured to operate as a client. In some embodiments, the distribution system 104 is configured to execute a number of program modules in order to perform various operations, actions, and/or functions described herein. In the illustrated embodiment, the distribution system 104 is configured to execute a keystore generation module 108 and a truststore generation module 110 to perform various operations, actions, and/or functions described herein. In other embodiments, however, a dedicated keystore distribution system is configured to execute the keystore generation module 108, and a dedicated truststore distribution system is configured to execute the truststore generation module 110. Each module may consist of a number of subcomponents executing on distribution systems or other computing systems or devices within, or in communication with, the distribution system 104. The keystore generation module 108 and the truststore generation module 110 may be combined. The modules may be implemented as software, hardware, or any combination thereof.

The keystore generation module 108 is configured to generate one or more keystore files for the SSL computing device 102 upon request. Some operations, actions, and/or functions performed by the keystore generation module 108 are described in greater detail herein below with reference to FIG. 3.

The truststore generation module 110 is configured to generate one or more truststore files for the SSL computing device 102 upon request. Some operations, actions, and/or functions performed by the truststore generation module 110 are described in greater detail herein below with reference to FIG. 4.

In some embodiments, the network 106 is the Internet. In some embodiments, the network 106 is operated by or for an owner of the SSL computing device 102. In some embodiments, the network 106 is configured to utilize one or more local area network ("LAN") networking technologies to facilitate communication among computing devices, databases, systems, and/or networking components within or attached to the network 106. The LAN networking technologies may facilitate such communication by providing wired and/or wireless connectivity, which may be provided in accordance with one or more Institute of Electrical and Electronic Engineers ("IEEE") standards, such as IEEE 802.3 ("Ethernet") and/or IEEE 802.11 ("WI-FI") standards. In some embodiments, the network 106 is an intranet. In some other embodiments, the network 106 is an extranet. In some embodiments, the network 106 includes some combination of the aforementioned network types.

In the illustrated embodiment, the SSL computing device 102 includes a properties file 112, which may store a keystore 114 and a truststore 116 received from the distribution system 104. The illustrated keystore 114 includes a private key 118 and a certificate 120, which includes a public key 122. The illustrated truststore 116 includes a trusted certificate 124. The keystore 114 may include multiple private keys 118 and certificates 120. The truststore may include multiple trusted certificates 124.

Figure 2:
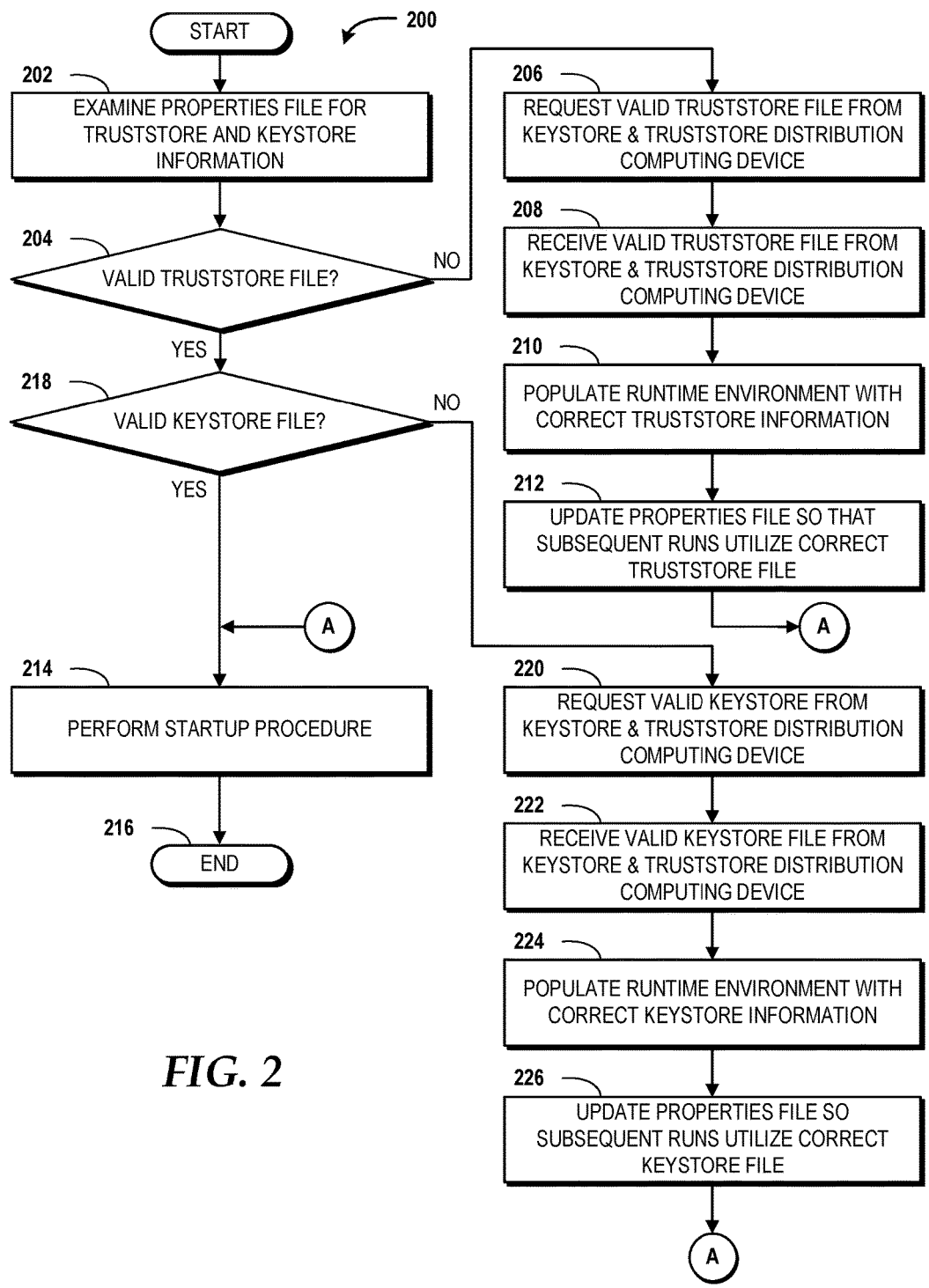
FIG. 2 is a flow diagram showing aspects of a method for managing keystore and truststore information on an SSL computing device, according to an illustrative embodiment.

Turning now to FIG. 2, a flow diagram showing aspects of a method 200 for managing keystore and truststore information on the SSL computing device 102 will be described, according to an illustrative embodiment. It should be understood that the operations, functions, or actions illustrated by one or more blocks in the methods disclosed herein are not necessarily presented in any particular order and that performance of some or all of the operations, functions, or actions in an alternative order(s) is possible and is contemplated. The operations, functions, or actions have been presented in the demonstrated order for ease of description and illustration. Operations, functions, or actions may be added, omitted, and/or performed simultaneously, without departing from the scope of the appended claims.

It also should be understood that the illustrated methods can be ended at any time and need not be performed in their respective entireties. Some or all operations, functions, or actions of the methods, and/or substantially equivalent operations, functions, or actions, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single processor or multi-processor systems, wireless devices, mobile devices, minicomputers, mainframe computers, personal computers, hand-held computing devices, processor-based, programmable consumer electronics, combinations thereof, and the like.

Thus, it should be appreciated that the logical operations, functions, or actions described herein may be implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations, functions, or actions described herein are referred to variously as states, operations, structural devices, acts, or modules. These operations, structural devices, acts, and modules may be implemented in software, in firmware, in special purpose digital logic, and any combination thereof.

The method 200 begins and proceeds to block 202, wherein the SSL computing device 102 examines the properties file 112 for truststore and keystore information. From block 202, the method 200 proceeds to block 204, wherein the SSL computing device 102 determines, based upon the examination at block 202, whether a valid truststore file is available to the SSL computing device 102. For instance, the SSL computing device 102 may determine, at block 204, whether a memory of the SSL computing device 102 has a valid truststore file stored thereon. In some embodiments, a truststore file is considered valid if the trusted certificate(s) 124 contained therein has not expired. In some embodiments, a truststore file is considered valid if the trusted certificate(s) 124 contained therein has not expired, but will expire within a predetermined time period, such as thirty days. In some embodiments, the truststore file is considered invalid if the truststore file has been corrupted or is unreadable by the SSL computing device 102. In some embodiments, a truststore file is not stored by the SSL computing device 102, in which case the SSL computing device 102 may determine, at block 204, that a valid truststore file does not exist. It is contemplated that the SSL computing device 102 may be configured with one or more parameters that indicate one or more conditions under which a truststore is to be considered valid and/or one or more conditions under which a truststore is to be considered invalid. In some embodiments, the SSL computing device 102 is configured not to examine the properties file 112 for a valid truststore file. In these embodiments, the SSL computing device 102 may examine the properties file 112 only for keystore information at block 202.

If the SSL computing device 102 determines that a valid truststore is not available to the SSL computing device 102, the method 200 proceeds to block 206. At block 206, the SSL computing device 102 requests a valid truststore file from the distribution system 104. From block 206, the method 200 proceeds to block 208, wherein the SSL computing device 102 receives a valid truststore file from the distribution system 104. The method 200 then proceeds to block 210, wherein the SSL computing device 102 populates a runtime environment with the correct truststore information obtained from the valid truststore file received at block 208. From block 210, the method 200 proceeds to block 212, wherein the SSL computing device 102 updates the properties file 112 to include the valid truststore file so that subsequent instances of the runtime environment utilize the valid truststore file. From block 212, the method 200 proceeds to block 214, wherein the SSL computing device 102 performs a startup procedure. In some embodiments, the startup procedure includes connecting to the network 106 so that the SSL computing device 102 may establish an SSL channel with one or more other computing devices. From block 214, the method 200 proceeds to block 216, wherein the method 200 ends. The method 200 may repeat (e.g., periodically, continuously, or on-demand).

If, at block 204, the SSL computing device 102 determines that a valid truststore is available to the SSL computing device 102, the method 200 proceeds to block 218. At block 218, the SSL computing device 102 determines whether a valid keystore file is available to the SSL computing device 102. In some embodiments, the keystore file is considered valid if the keystore file has not expired. In some embodiments, a keystore file is considered valid if the keystore file has not expired, but will expire within a predetermined time period, such as thirty days. In some embodiments, the keystore file is considered invalid if the keystore file has been corrupted or is unreadable by the SSL computing device 102. In some embodiments, a keystore file is not stored by the SSL computing device 102, in which case the SSL computing device 102 may determine, at block 218, that a valid keystore file does not exist. In some embodiments, the keystore file is considered invalid if the common name of a private key in the keystore file does not match a DNS to which the SSL computing device 102 is bound. In some embodiments, the keystore file is considered invalid if it does not contain a private key. It is contemplated that the SSL computing device 102 may be configured with one or more parameters that indicate one or more conditions under which a keystore is to be considered valid and/or one or more conditions under which a truststore is to be considered invalid. In some embodiments, the SSL computing device 102 is configured not to examine the properties file 112 for a valid keystore file. In these embodiments, the SSL computing device 102 may examine the properties file 112 only for truststore information at block 202.

If, at block 218, the SSL computing device 102 determines that a valid keystore is not available, the method 200 proceeds to block 220, wherein the SSL computing device 102 requests a valid keystore file from the distribution system 104. From block 220, the method 200 proceeds to block 222, wherein the SSL computing device 102 receives a valid keystore file from the distribution system 104. The method 200 then proceeds to block 224, wherein the SSL computing device 102 populates a runtime environment with the correct keystore information obtained from the valid keystore file received at block 222. From block 224, the method 200 proceeds to block 226, wherein the SSL computing device 102 updates the properties file 112 to include the valid keystore file so that subsequent instances of the runtime environment utilize the valid keystore file. From block 226, the method 200 proceeds to block 214, wherein the SSL computing device 102 performs a startup procedure. From block 214, the method 200 proceeds to block 216, wherein the method 200 ends. The method 200 may repeat (e.g., periodically, continuously, or on-demand).

If, at block 218, the SSL computing device 102 determines that a valid keystore is available, the method 200 proceeds to block 214, wherein the SSL computing device 102 performs the startup procedure. The method 200 then proceeds to block 216, wherein the method 200 ends. The method 200 may repeat (e.g., periodically, continuously, or on-demand).

Figure 3:
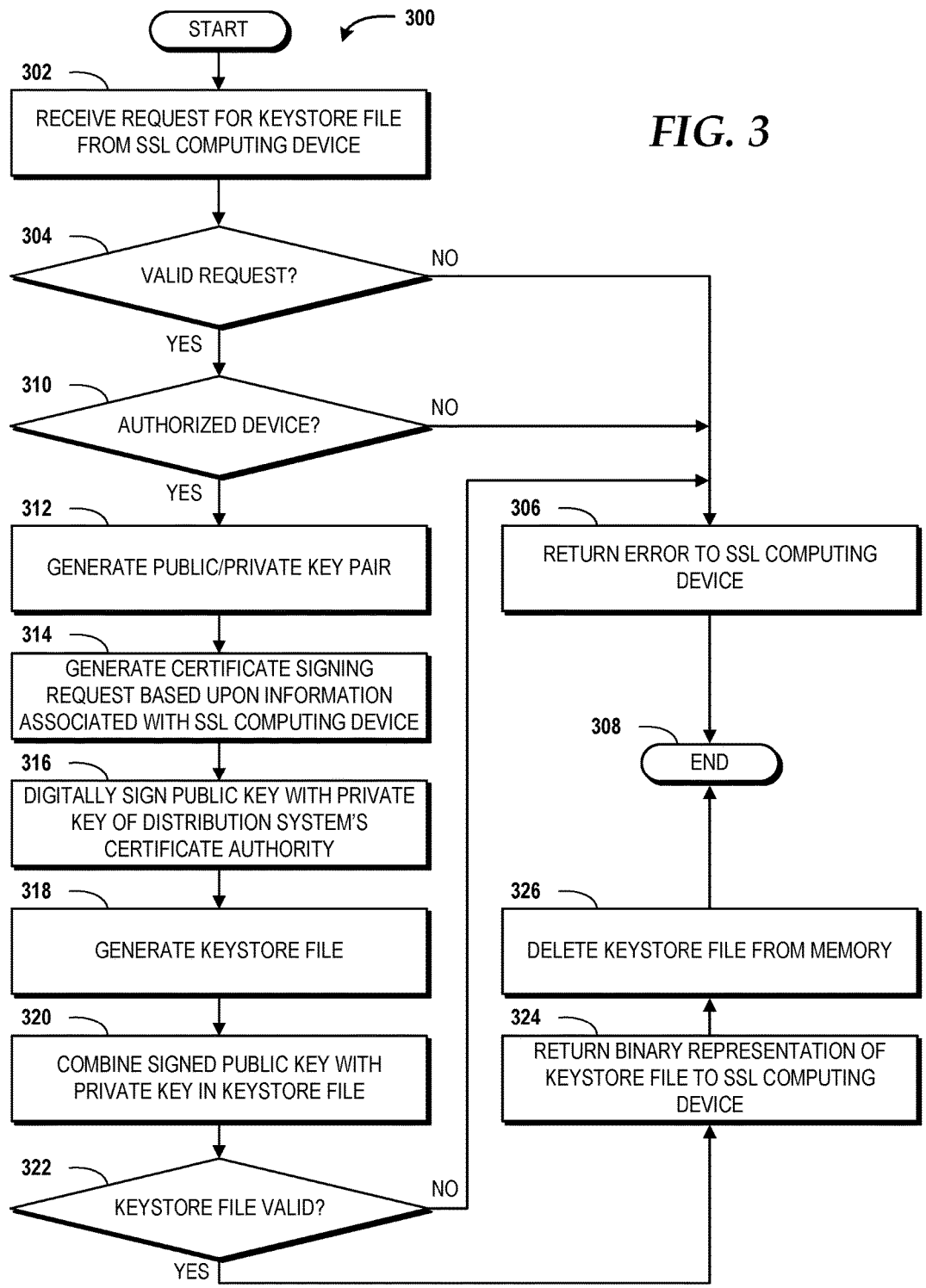
FIG. 3 is a flow diagram showing aspects of a method for generating a keystore, according to an illustrative embodiment.

Turning now to FIG. 3, a method 300 for generating a keystore file will be described, according to an illustrative embodiment. The method 300 begins and proceeds to block 302, wherein the distribution system 104 receives a request for a keystore file from the SSL computing device 102. From block 302, the method proceeds to block 304, wherein the distribution system 104 determines if the request is a valid request. A request may be considered invalid if the request process is interrupted while the distribution system 104 is trying to receive the request from the SSL computing device 102 and, as a result, an incomplete or incorrect request is received by the distribution system 104, which was unable to process the request. Alternatively, a request may be considered invalid if the request does not fulfill one or more preconditions of the distribution system 104 for handling the request. For example, the password field is too short or not all of the fields needed to create a CSR were received in the request.

If the distribution system 104 determines that the request is invalid, the method 300 proceeds to block 306, wherein the distribution system 104 returns an error to the SSL computing device 102. In some embodiments, the error includes an indication why the request failed, such as because the request was invalid in this particular instance. In some other embodiments, the error does not include an indication as to why the request failed. In some embodiments, block 306 is omitted and the SSL computing device 102 is not informed of the failed request, in which case the SSL computing device 102 may timeout and retry the request. From block 306, the method 300 proceeds to block 308, wherein the method 300 ends. The method 300 may repeat (e.g., periodically, continuously, or on-demand).

If, at block 304, the distribution system 104 determines that the request is valid, the method 300 proceeds to block 310, wherein the distribution system 104 determines if the SSL computing device 102 is authorized. The SSL computing device 102 may be unauthorized if the rules the distribution system 104 is operating under specify that a person, group, or another criteria is not met by the requestor. For example, the distribution system 104 may be configured to allow only computing devices under the bar.att.com DNS suffix to request a keystore, and the SSL computing device 102 requesting the keystore has the DNS suffix of glitch.sbc.com; as a result, the distribution system 104 may refuse to honor the request because of the rules that state it cannot allow this particular DNS suffix. In some embodiments, the SSL computing device 102 is unauthorized if the SSL computing device 102 did not receive prior authorization to request a keystore file from the distribution system 104. For instance, the SSL computing device 102 may be required to authenticate to the distribution system 104 in order to be included within a white list maintained by or for the distribution system 104 to track authorized hosts. If the distribution system 104 determines that the SSL computing device 102 is not authorized, the method 300 proceeds to block 306, wherein the distribution system 104 returns an error to the SSL computing device 102. In some embodiments, the error includes an indication that the request failed because the SSL computing device 102 is not authorized. In some other embodiments, the error does not include an indication as to why the request failed. In some embodiments, block 306 is omitted and the SSL computing device 102 is not informed of the failed request, in which case the SSL computing device 102 may timeout and retry the request. From block 306, the method 300 proceeds to block 308, wherein the method 300 ends. The method 300 may repeat (e.g., periodically, continuously, or on-demand).

If, at block 310, the distribution system 104 determines that the SSL computing device 102 is authorized, the method 300 proceeds to block 312, wherein the distribution system 104 generates a key pair including a public key and a private key. From block 312, the method 300 proceeds to block 314, wherein the distribution system 104 generates a certificate signing request ("CSR") based upon information associated with the SSL computing device 102. From block 314, the method 300 proceeds to block 316, wherein the distribution system 104 digitally signs the public key with a private key provided by a certificate authority of the distribution system 104. From block 316, the method 300 proceeds to block 318, wherein the distribution system 104 creates a keystore file. The method 300 then proceeds to block 320, wherein the distribution system 104 combines the signed public key with the private key generated at block 312 in the keystore file. From block 320, the method 300 proceeds to block 322, wherein the distribution system 104 determines if the keystore file is valid. In some embodiments, the process the distribution system 104 follows may be required to be completed without any error or warnings. For example, if any of the steps involved in creating the key pair, the certificate, or a combination of the two into a keystore cause an error such as, but not limited to, a malformed key or certificate, unavailable libraries needed to programmatically complete the request, or unrelated operating system or hardware errors, the distribution system 104 may store the error(s), exit the process used to create the keystore, and return an error to the client because the distribution system 104 cannot guarantee that all of the steps completed successfully.

If the distribution system 104 determines that the keystore file is invalid, the method 300 proceeds to block 306, wherein the distribution system 104 returns an error to the SSL computing device 102. In some embodiments, the error includes an indication that the request failed because the distribution system 104 failed to generate a valid keystore file. In some other embodiments, the error does not include an indication as to why the request failed. In some embodiments, block 306 is omitted and the SSL computing device 102 is not informed of the failed request, in which case the SSL computing device 102 may timeout and retry the request. From block 306, the method 300 proceeds to block 308, wherein the method 300 ends. If the distribution system 104 determines that the keystore file is valid, the method 300 proceeds to block 324, wherein the distribution system 104 returns a binary representation of the keystore file to the SSL computing device 102. From block 324, the method 300 proceeds to block 326, wherein the distribution system 104 deletes the keystore file from memory, thereby preventing key escrow. From block 326, the method 300 proceeds to block 308, wherein the method 300 ends. The method 300 may repeat (e.g., periodically, continuously, or on-demand).

Figure 4:
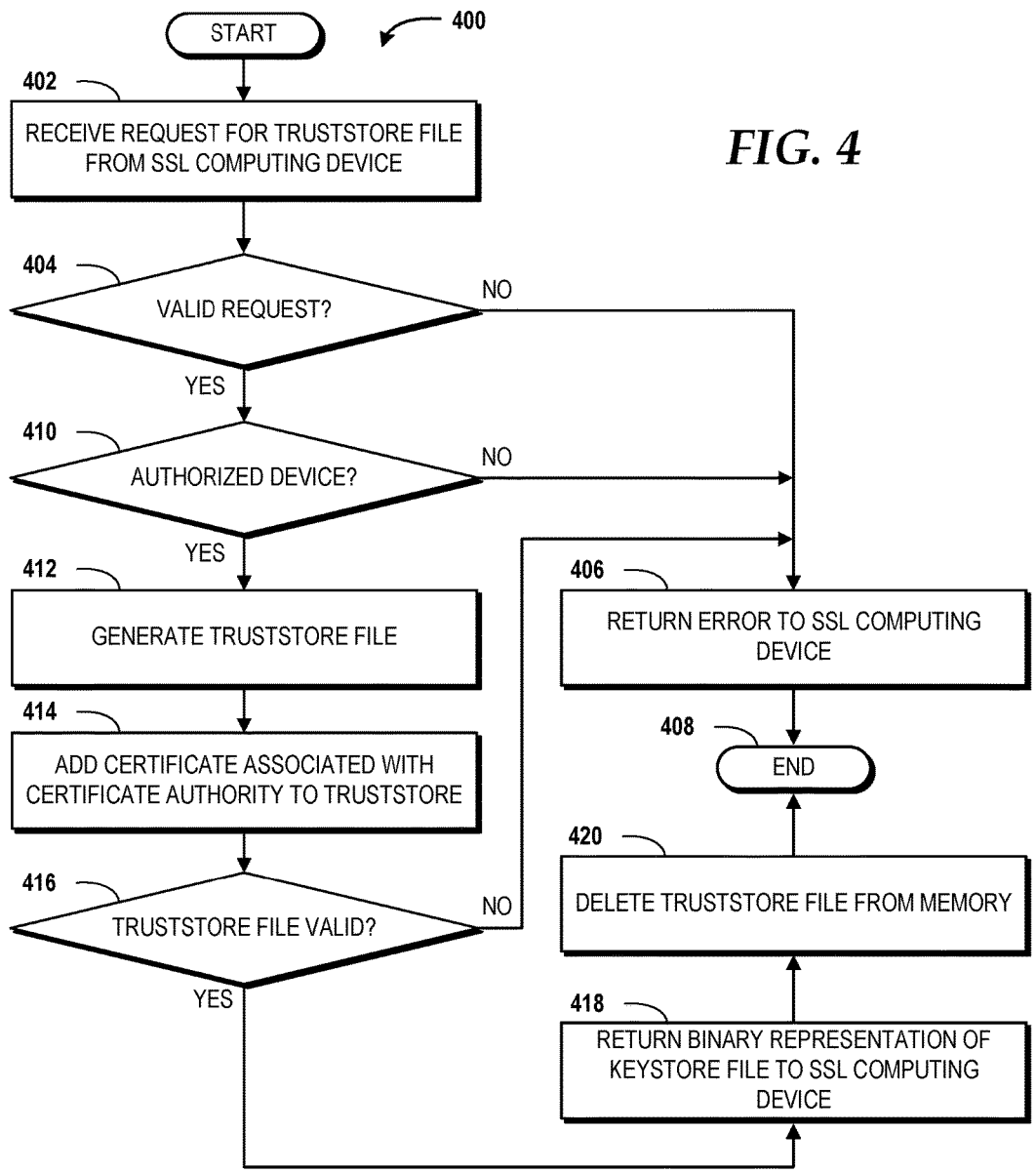
FIG. 4 is a flow diagram showing aspects of a method for generating a truststore, according to an illustrative embodiment.

Turning now to FIG. 4, a method 400 for generating a truststore file will be described, according to an illustrative embodiment. The method 400 begins and proceeds to block 402, wherein the distribution system 104 receives a request for a truststore file from the SSL computing device 102. From block 402, the method 400 proceeds to block 404, wherein the distribution system 104 determines if the request is a valid request. A request may be considered invalid if the request process is interrupted while the distribution system 104 is receiving the request from the SSL computing device 102 and, as a result, an incomplete or incorrect request was received by the distribution system 104, which was unable to process the request. Alternatively, a request may be considered invalid if the request does not fulfill one or more preconditions of the distribution system 104 for handling the request. For example, the password field is too short.

If the distribution system 104 determines that the request is invalid, the method 400 proceeds to block 406, wherein the distribution system 104 returns an error to the SSL computing device 102. In some embodiments, the error includes an indication why the request failed, such as because the request was invalid in this particular instance. In some other embodiments, the error does not include an indication as to why the request failed. In some embodiments, block 406 is omitted and the SSL computing device 102 is not informed of the failed request, in which case the SSL computing device 102 may timeout and retry the request. From block 406, the method 400 proceeds to block 408, wherein the method 400 ends. The method 400 may repeat (e.g., periodically, continuously, or on-demand).

If, at block 404, the distribution system 104 determines that the request is valid, the method 400 proceeds to block 410, wherein the distribution system 104 determines if the SSL computing device 102 is authorized. The SSL computing device 102 may be unauthorized if the rules the distribution system 104 is operating under specify that a person, group, or another criteria is not met by the requestor. For example, the distribution system 104 may be configured to allow only computing devices under the bar.att.com DNS suffix to request a truststore, and the SSL computing device 102 requesting the truststore has the DNS suffix of glitch.sbc.com; as a result, the distribution system 104 may refuse to honor the request because of the rules that state it cannot allow this particular DNS suffix. In some embodiments, the SSL computing device 102 is unauthorized if the SSL computing device 102 did not receive prior authorization to request a truststore file from the distribution system 104. For instance, the SSL computing device 102 may be required to authenticate to the distribution system 104 in order to be included within a white list maintained by or for the distribution system 104 to track authorized hosts. If the distribution system 104 determines that the SSL computing device 102 is not authorized, the method 400 proceeds to block 406, wherein the distribution system 104 returns an error to the SSL computing device 102. In some embodiments, the error includes an indication that the request failed because the SSL computing device 102 is not authorized. In some other embodiments, the error does not include an indication as to why the request failed. In some embodiments, block 406 is omitted and the SSL computing device 102 is not informed of the failed request, in which case the SSL computing device 102 may timeout and retry the request. From block 406, the method 400 proceeds to block 408, wherein the method 400 ends. The method 400 may repeat (e.g., periodically, continuously, or on-demand).

If, at block 410, the distribution system 104 determines that the SSL computing device 102 is authorized, the method 400 proceeds to block 412, wherein the distribution system 104 generates a truststore file. The method 400 then proceeds to block 414, wherein the distribution system 104 adds a certificate associated with the certificate authority of the distribution system 104 to the truststore file. From block 414, the method 400 proceeds to block 416, wherein the distribution system 104 determines if the truststore file is valid. In some embodiments, the process the distribution system 104 follows may be required to be completed without any error or warnings. For example, if any of the steps involved in loading the required certificate authorities into a truststore cause an error such as, but not limited to, a malformed certificate, unavailable libraries needed to programmatically complete the request, the inability to read or open the required certificate authority files, or unrelated operating system or hardware errors, the distribution system 104 may store the error(s), exit the process used to create the truststore, and return an error to the client because the distribution system 104 cannot guarantee that all of the steps completed successfully.

If the distribution system 104 determines that the truststore file is invalid, the method 400 proceeds to block 406, wherein the distribution system 104 returns an error to the SSL computing device 102. In some embodiments, the error includes an indication why the request failed, such as because the request was invalid in this particular instance. In some other embodiments, the error does not include an indication as to why the request failed. In some embodiments, block 406 is omitted and the SSL computing device 102 is not informed of the failed request, in which case the SSL computing device 102 may timeout and retry the request. From block 406, the method 400 proceeds to block 408, wherein the method 400 ends. The method 400 may repeat (e.g., periodically, continuously, or on-demand).

If, at block 416, the distribution system 104 determines that the truststore file is valid, the method 400 proceeds to block 418, wherein the distribution system 104 returns a binary representation of the truststore file to the SSL computing device 102. From block 418, the method 400 proceeds to block 420, wherein the distribution system 104 deletes the truststore file from memory, thereby preventing key escrow. From block 420, the method 400 proceeds to block 408, wherein the method 400 ends. The method 400 may repeat (e.g., periodically, continuously, or on-demand).

Figure 5:
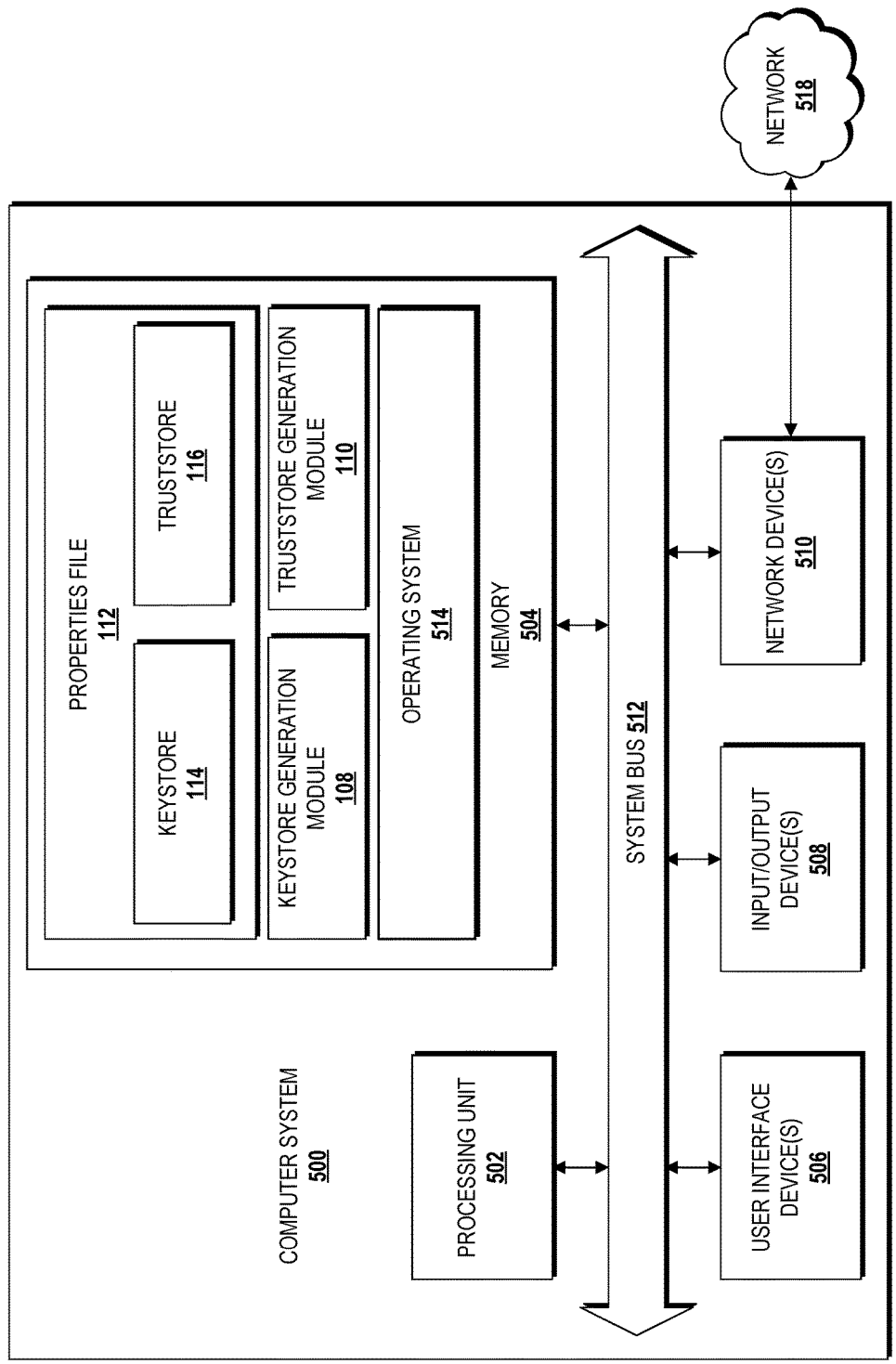
FIG. 5 is a computer architecture diagram illustrating an illustrative computer hardware and software architecture for a computing system capable of implementing aspects of the embodiments presented herein.

FIG. 5 is a block diagram illustrating a computer architecture 500 configured to perform various operations disclosed herein for generating SSL keystores and truststores. Thus, the computer architecture 500 illustrated in FIG. 5 illustrates an architecture for a personal computer, a desktop workstation, a laptop computer, a tablet computer, a notebook computer, an ultraportable computer, a PDA, an electronic-book reader, a smartphone, a game console, a set-top box, a consumer electronics device, a server computer, or any other type of computing device configured to perform the various operations described herein for generating SSL keystores and truststores. The computer architecture 500 may be utilized to execute any aspects of the software components presented herein.

In some embodiments, the distribution system 104 is configured in accordance with the computer architecture 500. In some embodiments, the SSL computing device 102 is configured in accordance with the computer architecture 500. As such, software components of the distribution system 104 and the SSL computing device 102 are shown together within the computer architecture 500 for ease of illustration. It should be understood, however, that these software components may be and are likely to be implemented in separate systems as in the embodiment illustrated in FIG. 1.

The computer architecture 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the computer architecture 500. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The illustrated memory 504 includes an operating system 514, the keystore generation module 108, the truststore generation module 110, the properties file 112, the keystore 114, and the truststore 116.

The operating system 514 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 506 may include one or more devices with which a user accesses the computer architecture 500. The user interface devices 506 may include, but are not limited to, computers, servers, personal digital assistants, telephones (e.g., cellular, IP, or landline), or any suitable computing devices. The I/O devices 508 enable a user to interface with the program modules. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus.

Further, the I/O devices 508 may include one or more output devices, such as, but not limited to, a display screen or a printer.

The network devices 510 enable the computer architecture 500 to communicate with other networks or remote systems via a network 518. Examples of the network devices 510 include, but are not limited to, a modem, a radio frequency ("RF") or infrared ("IR") transceiver, a telephonic interface, a bridge, a router, a network card, or network edge components. The network 518 may include a wireless network such as, but not limited to, a WLAN such as a WI-FI network, a WWAN, a wireless personal area network ("WPAN") such as BLUETOOTH, or a wireless metropolitan area network ("WMAN"). Alternatively, the network 518 may be a wired network such as, but not limited to, a WAN) such as the Internet, a LAN such as the Ethernet, a wired personal area network ("PAN"), or a wired metropolitan area network ("MAN"). The network 518 may be the network 106 or a network connected thereto.

The network 518 embodied as a cellular network may utilize a mobile telecommunications technology such as, but not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 518 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards.

As used herein, communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the architecture 500. For purposes of the claims, the phrase "computer storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for generating SSL keystores and truststores have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-readable storage medium storing instructions that, when executed by a processor of a computing device, cause the processor to perform operations comprising:
   requesting a keystore file from a keystore distribution system;
   receiving the keystore file from the keystore distribution system, wherein the keystore file comprises a signed public key combined, by the keystore distribution system, with a private key generated by the keystore distribution system, and wherein the signed public key comprises a public key generated by the keystore distribution system that is digitally signed with a private key provided by a certificate authority of the keystore distribution system; and performing a startup procedure utilizing the keystore file to establish, by the computing device, a secure channel over which to exchange information with at least one client computing device over a network.

2. The computer-readable storage medium of claim 1, wherein the operations further comprise prior to requesting the keystore file from the keystore distribution system, obtaining authorization to request a keystore file from the keystore distribution system; and examining a properties file contained within a memory of the computing device for an existing keystore file.

3. The computer-readable storage medium of claim 2, wherein the operations further comprise:

finding the existing keystore file in the properties file; and determining if the existing keystore file is valid or invalid, wherein the computing device comprises at least one parameter indicating at least one condition under which keystone files are considered invalid.

4. The computer-readable storage medium of claim 3, wherein performing the startup procedure comprises performing the startup procedure utilizing the existing keystore file in response to determining that the existing keystore file is valid.

5. The computer-readable storage medium of claim 3, wherein requesting the keystore file from the keystore distribution system comprises requesting the keystore file from the keystore distribution system in response to determining that the existing keystore file is invalid.

6. The computer-readable storage medium of claim 5, wherein the operations further comprise updating the properties file to include the keystore file, wherein the keystore file replaces the existing keystore file in the properties file.

7. The computer-readable storage medium of claim 1, wherein the operations further comprise populating a runtime environment with keystore information contained within the keystore file.

8. The computer-readable storage medium of claim 1, wherein the operations further comprise:

requesting a truststore file from a truststore distribution system;

receiving the truststore file from the truststore distribution system, wherein the truststore file comprises a certificate from a party that the computing device expects to communicate with; and populating a runtime environment with truststore information contained within the truststore file.

9. The computer-readable storage medium of claim 8, wherein the operations further comprise:

prior to requesting the truststore file from the truststore distribution system, examining a properties file for an existing truststore file;

finding the existing truststore file in the properties file; and determining whether the existing truststore file is valid or invalid, wherein performing the startup procedure comprises performing the startup procedure utilizing the existing truststore file if the existing truststore file is valid, and wherein requesting the truststore file from the truststore distribution system comprises requesting the truststore file from the truststore distribution system if the existing truststore file is invalid.

10. The computer-readable storage medium of claim 9, wherein the keystore distribution system and the truststore distribution system are included in a single distribution system.

11. A computing device comprising:

a processor; and a memory that stores instructions that, when executed by the processor, cause the processor to perform operations comprising requesting a keystore file from a keystore distribution system, receiving the keystore file from the keystore distribution system, wherein the keystore file comprises a signed public key combined, by the keystore distribution system, with a private key generated by the keystore distribution system, and wherein the signed public key comprises a public key generated by the keystore distribution system that is digitally signed with a private key provided by a certificate authority of the keystore distribution system, and performing a startup procedure utilizing the keystore file to establish, by the computing device, a secure channel over which to exchange information with at least one client computing device over a network.

12. The computing device of claim 11, wherein the operations further comprise prior to requesting the keystore file from the keystore distribution system, obtaining authorization to request a keystore file from the keystore distribution system; and examining a properties file contained within the memory of the computing device for an existing keystore file.

13. The computing device of claim 12, wherein the operations further comprise:

finding the existing keystore file in the properties file; and determining if the existing keystore file is valid or invalid, wherein the computing device comprises at least one parameter indicating at least one condition under which keystone files are considered invalid.

14. The computing device of claim 13, wherein performing the startup procedure comprises performing the startup procedure utilizing the existing keystore file in response to determining that the existing keystore file is valid.

15. The computing device of claim 13, wherein requesting the keystore file from the keystore distribution system comprises requesting the keystore file from the keystore distribution system in response to determining that the existing keystore file is invalid.

16. The computing device of claim 15, wherein the operations further comprise updating the properties file to include the keystore file, wherein the keystore file replaces the existing keystore file in the properties file.

17. The computing device of claim 11, wherein the operations further comprise populating a runtime environment with keystore information contained within the keystore file.

18. The computing device of claim 11, wherein the operations further comprise:

requesting a truststore file from a truststore distribution system;

receiving the truststore file from the truststore distribution system, wherein the truststore file comprises a certificate from a party that the computing device expects to communicate with; and populating a runtime environment with truststore information contained within the truststore file.

19. The computing device of claim 18, wherein the operations further comprise:

prior to requesting the truststore file from the truststore distribution system, examining a properties file for an existing truststore file;

finding the existing truststore file in the properties file; and determining whether the existing truststore file is valid or invalid, wherein performing the startup procedure comprises performing the startup procedure utilizing the existing truststore file if the existing truststore file is valid, and wherein requesting the truststore file from the truststore distribution system comprises requesting the truststore file from the truststore distribution system if the existing truststore file is invalid.

20. A method comprising:

requesting, by a computing device comprising a processor, a keystore file from a keystore distribution system;

receiving, by the computing device, the keystore file from the keystore distribution system, wherein the keystore file comprises a signed public key combined, by the keystore distribution system, with a private key generated by the keystore distribution system, and wherein the signed public key comprises a public key generated by the keystore distribution system that is digitally signed with a private key provided by a certificate authority of the keystore distribution system; and performing, by the computing device, a startup procedure utilizing the keystore file to establish, by the computing device, a secure channel over which to exchange information over a network with at least one client computing device.

* * * * *